(12) United States Patent
Cannon et al.

(10) Patent No.: US 7,007,177 B2
(45) Date of Patent: Feb. 28, 2006

(54) EXTENDED POWER SAVINGS FOR ELECTRONIC DEVICES

(75) Inventors: Joseph M. Cannon, Harleysville, PA (US); Philip D. Mooney, North Wales, PA (US)

(73) Assignee: Agere Systems, Inc., Allentown, PA (US)

( * ) Notice: Subject to any disclaimer, the term of this patent is extended or adjusted under 35 U.S.C. 154(b) by 531 days.

(21) Appl. No.: 10/263,726

(22) Filed: Oct. 4, 2002

(65) Prior Publication Data

US 2003/0032463 A1    Feb. 13, 2003

Related U.S. Application Data

(62) Division of application No. 09/305,206, filed on May 5, 1999, now Pat. No. 6,501,969.

(51) Int. Cl.
  *G06F 1/26* (2006.01)
  *G06F 1/32* (2006.01)
  *H04B 1/38* (2006.01)

(52) U.S. Cl. ................ 713/300; 713/323; 455/574
(58) Field of Classification Search ........... 713/300, 713/323; 455/574
   See application file for complete search history.

(56) References Cited

U.S. PATENT DOCUMENTS

| | | | |
|---|---|---|---|
| 4,367,455 A | * | 1/1983 | Fried ................ 340/310.01 |
| 4,449,248 A | | 5/1984 | Leslie et al. |
| 4,703,163 A | * | 10/1987 | Genest ................... 235/382 |
| 4,805,203 A | | 2/1989 | Oda |
| 4,857,759 A | | 8/1989 | Murphy et al. |
| 4,860,005 A | | 8/1989 | DeLuca et al. |
| 4,964,121 A | | 10/1990 | Moore |
| 5,023,932 A | | 6/1991 | Wakana |
| 5,031,231 A | | 7/1991 | Miyazaki |
| 5,054,052 A | | 10/1991 | Nonami |
| 5,153,580 A | * | 10/1992 | Pollack ................. 340/825.25 |
| 5,224,152 A | | 6/1993 | Harte |
| 5,353,341 A | | 10/1994 | Gillis et al. |
| 5,363,430 A | | 11/1994 | Yamagata et al. |

(Continued)

*Primary Examiner*—Chun Cao
*Assistant Examiner*—Ji H. Bae (57) ABSTRACT

Apparatus and method to minimize power usage by electronic devices. In a particular disclosed example, the battery power of a remote handset is reduced by extending the sniff period of a cordless telephone when the remote handset is remote from its base unit and the user is not likely to use the cordless telephone (e.g., when away from the house or when asleep). A low power mode module causes the electronic device, e.g., the remote handset of a cordless telephone, to remain in an extended low power STANDBY mode, or to extends the period of the periodic transition to a receive only STANDBY mode to check status registers at the base unit, at appropriate times. In one embodiment, a low power mode table contains entries defining periods of time during which the remote handset may transition between the low power STANDBY mode and the receive only STANDBY mode. The remote handset transitions to a fully powered transmit/receive (TDD) ON mode, e.g., in response to an appropriate status condition, or in response to the activation of a particular button or sequence of buttons at the remote handset. The extended STANDBY mode may alternatively be activated in response to input from an external device such as a home security system indicating that the user of the cordless telephone is not willing or able to answering any incoming telephone calls. The extended STANDBY mode may also be entered upon determination by the cordless telephone that the telephone line is already in use by another extension (thereby rendering unlikely any receipt of a ring signal condition from the base unit).

18 Claims, 5 Drawing Sheets

U.S. PATENT DOCUMENTS

| | | |
|---|---|---|
| 5,375,254 A | 12/1994 | Owen |
| 5,471,655 A | 11/1995 | Kivari |
| 5,507,039 A | 4/1996 | Honma |
| 5,515,043 A | 5/1996 | Berard et al. |
| 5,519,762 A * | 5/1996 | Bartlett ........................ 455/574 |
| 5,613,235 A | 3/1997 | Kivari et al. |
| 5,625,882 A | 4/1997 | Vook et al. |
| 5,627,882 A | 5/1997 | Chien et al. |
| 5,689,549 A | 11/1997 | Bertocci et al. |
| 5,745,849 A | 4/1998 | Britton |
| 5,765,104 A | 6/1998 | Kushita |
| 5,778,311 A | 7/1998 | Nakanishi |
| 5,799,256 A | 8/1998 | Pombo et al. |
| 6,002,427 A * | 12/1999 | Kipust ........................ 348/156 |
| 6,035,191 A | 3/2000 | Moore |
| 6,078,819 A | 6/2000 | Ciccone et al. |
| 6,138,032 A | 10/2000 | Hill et al. |
| 6,205,333 B1 | 3/2001 | Abe |
| 6,501,969 B1 * | 12/2002 | Cannon et al. ............. 455/574 |
| 6,868,292 B1 * | 3/2005 | Ficco et al. ................... 700/19 |

* cited by examiner

| TIME PERIOD OR EVENT | LOW POWER MODE ? | |
|---|---|---|
| 11:00 P.M. – 6:00 A.M. | YES | 402 |
| 6:00 A.M. – 8:00 A.M. | NO | 404 |
| 8:00 A.M. – 3:30 P.M. | YES | 406 |
| 3:30 P.M. – 11:00 P.M. | NO | 408 |
| TELEPHONE LINE OFF-HOOK DURING NON-LOW POWER MODE TIME PERIOD | YES | 410 |
| HOME SECURITY SYSTEM ACTIVATED | YES | 412 |
| TELEPHONE ANSWERING DEVICE SET FOR IMMEDIATE ANSWER | YES | 414 |
| NO ACTIVITY DETECTED ON TELEPHONE LINE FOR $x$ MINUTES | YES | 416 |
| ETC. ⋮ | ETC. ⋮ | 418 |

EXTENDED POWER SAVINGS FOR ELECTRONIC DEVICES

This application is a divisional application of application Ser. No. 09/305,206, filed May 5, 1999 U.S. Pat. No. 6,501,969, the entirety of which is explicitly incorporated herein by reference.

BACKGROUND OF THE INVENTION

1. Field of the Invention

This invention relates generally to electronic devices, such as a cordless telephone. More particularly, it relates to any electronic device which reduces standby power to minimize power usage based on selective criteria.

2. Background of Related Art

A modern home typically contains many electronic devices, e.g., home entertainment equipment such as televisions, video cassette recorders (VCRs), digital video disk (DVD) players, compact disk (CD) players, cordless telephones, etc.

As a particular example for the purpose of explanation, a modern home may contain a cordless telephone. A cordless telephone typically includes a cordless, remote handset, and an associated base unit or station. Typically, the base unit is powered by conventional AC current from a household electrical outlet and the remote handset operates using battery power. To recharge the battery in the remote handset, the remote handset is typically inserted into a cradle in the base station and recharging power (e.g., trickle power) is applied to the battery of the remote handset using the AC current of the base unit. Most users of cordless telephones, however, desire to keep the remote handset away from the base unit for extended periods of time, e.g., so that they may carry the remote handset with them as they move about their residence or other locale.

When removed from the base unit, it is typically desirable for the user to have the remote handset ring as soon as possible or feasible after a ring signal is detected on the telephone line by the base unit. To accomplish this, the remote handset is required to be in an ON mode having continuous communication with the base unit. In this way, the remote handset can detect and receive the incoming ring signal as soon as it is first transmitted by the base unit.

Another technique to conserve some battery power and thereby have the potential to extend the operational life of the remote handset between charges is to periodically power-down and power-up the remote handset. In this STANDBY mode, the remote handset is periodically powered-up at desired intervals to receive a status update from the base unit, then if not required to perform a particular task the remote handset will power back down. In this way, the remote handset will periodically enter the low power STANDBY mode and turn on the RF front end in a receive only mode to check if, e.g., an incoming call is being received by the base unit. If, e.g., an incoming ring signal is detected in the status update, the remote handset will fully power up and enter an ON mode. The remote handset will also enter the ON mode in response to the activation of a button or appropriate sequence of buttons on the remote handset or base unit.

Thus, in the typical STANDBY mode, a remote handset must periodically communicate with the base unit, e.g. approximately every one (1) second or so, to receive a ring signal relating to an incoming telephone call, at least within a reasonable proximity to when the ring signal was originally detected on the telephone line into the base unit. Moreover, the periodic communication helps the remote handset to maintain an aligned communication link with the base unit.

Much of the battery power in a typical remote handset is utilized by a radio frequency (RF) front end. The RF front end provides the radio communications between the base unit and the remote handset. When the remote handset is in its ON mode, the RF front end will require a significant power drain from the battery in the remote handset, causing perhaps the shortest possible operational life between charges. Moreover, even though the STANDBY mode has the potential to extend the operational life of the remote handset significantly, the periodic powering of the RF front end still utilizes a significant amount of battery power.

Figure 1:
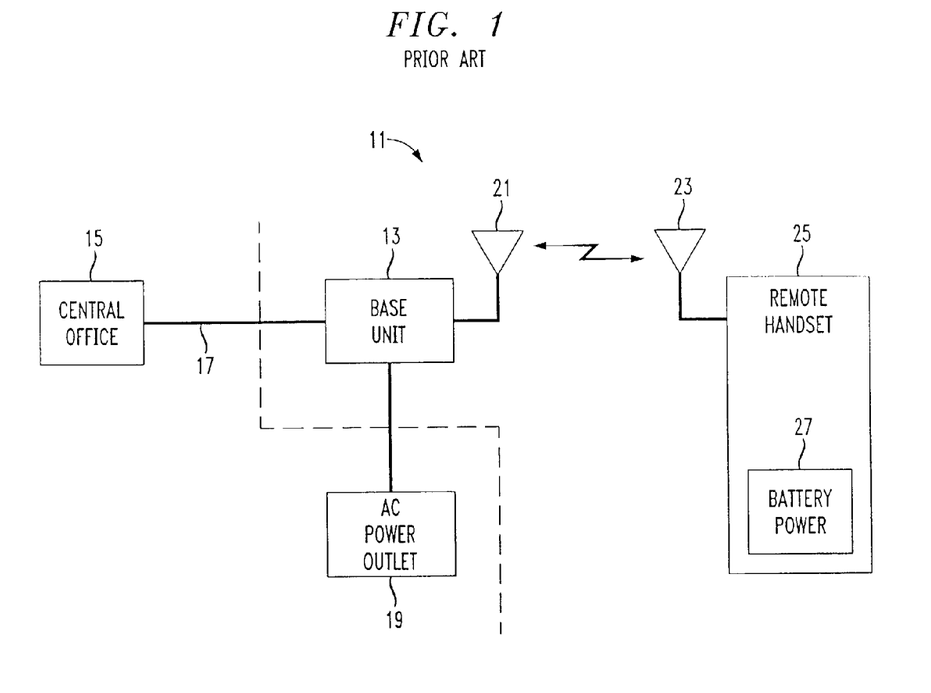
FIG. 1 illustrates a conventional cordless telephone operating on a single telephone line.

FIG. 1 illustrates a conventional single handset, cordless telephone capable of answering an incoming call on a telephone line.

In particular, in FIG. 1, a cordless telephone 11 has a base unit 13 connected to a telephone company central office 15 via a telephone line 17. The base unit 13 is connected to a conventional household AC power outlet 19 for providing power to the base unit 13.

The base unit 13 further includes a base unit antenna 21 for communication with a remote handset antenna 23 on a remote handset 25. The remote handset 25 includes a battery 27 for providing power to the remote handset 25. The battery 27 is rechargeable by the conventional household AC power outlet 19 by placing the remote handset 25, e.g., into an appropriate cradle in the base unit 13.

When a ring signal is detected by the base unit 13 over the telephone line 17, the ring signal status is transmitted over the base unit antenna 21 to the handset antenna 23 for detection by the remote handset 25 to cause the remote handset 25 to ring and thereby indicate the presence of an incoming telephone call to the user.

In an ON mode, the remote handset 25 is in continuous communication with the base unit 13, e.g., actively transmitting and/or receiving data and/or control information with the base unit 13. In a STANDBY mode, the communications are periodic and receive only. In an OFF mode, the remote handset 25 is not in communications with the base unit 13 and is not able to detect and/or receive a ring signal from the base unit 13.

In any event, the user must recharge the battery 27 in the remote handset 25 by returning the remote handset 25 to the cradle in the base unit 13 to allow the battery 27 to be recharged by the AC power from the outlet 19. This recharging requirement necessarily requires connection of the remote handset to the base unit, and thus deprives the user of much of the flexibility and utility of a cordless telephone, at least while it is recharging.

Accordingly, there exists a need for apparatus and techniques for minimizing power usage of home electronic equipment such as a cordless telephone, to either minimize power usage in general and, for battery powered devices, to maximize the operational time between charges.

SUMMARY OF THE INVENTION

In accordance with the principles of the present invention, a cordless telephone comprises a base station, a remote handset associated with and supported by the base station, and a low power mode module within the remote handset. The low power mode module causes the remote handset to maintain a standby condition during at least one predetermined time period.

A method to reduce battery power usage in a remote handset of a cordless telephone when the remote handset is remote from its base unit in accordance with another aspect of the present invention comprises maintaining the remote handset in a standby mode for an extended period of time during an occurrence of a predetermined time period.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a cordless telephone and method for reducing the power consumption of the battery in the remote handset of the cordless telephone by causing the battery in the handset to enter an extended STANDBY mode or low power mode during predetermined time periods and/or upon the occurrence of predetermined events. The remote handset may synchronize status and/or control information with the base unit in coordination with the extended STANDBY mode.

In a conventional cordless telephone, the remote handset periodically powers up from a low power STANDBY mode (e.g., a "sleep" mode) to a receive only STANDBY mode (e.g., "sniff" mode), e.g., once every second, to quickly receive status information from the base unit. Then, the remote handset powers back to the STANDBY mode (i.e., radio frequency communications off) if further communications with the base unit are not required. If, during the status check, further communications are desired with the remote handset, the remote handset will transition from the receive only STANDBY mode to a fully powered transmission and receive ON mode and perform the requested duties, e.g., ringing, opening a voice communication channel with the telephone line interface of the base unit, and/or terminating a telephone call.

Figure 2:
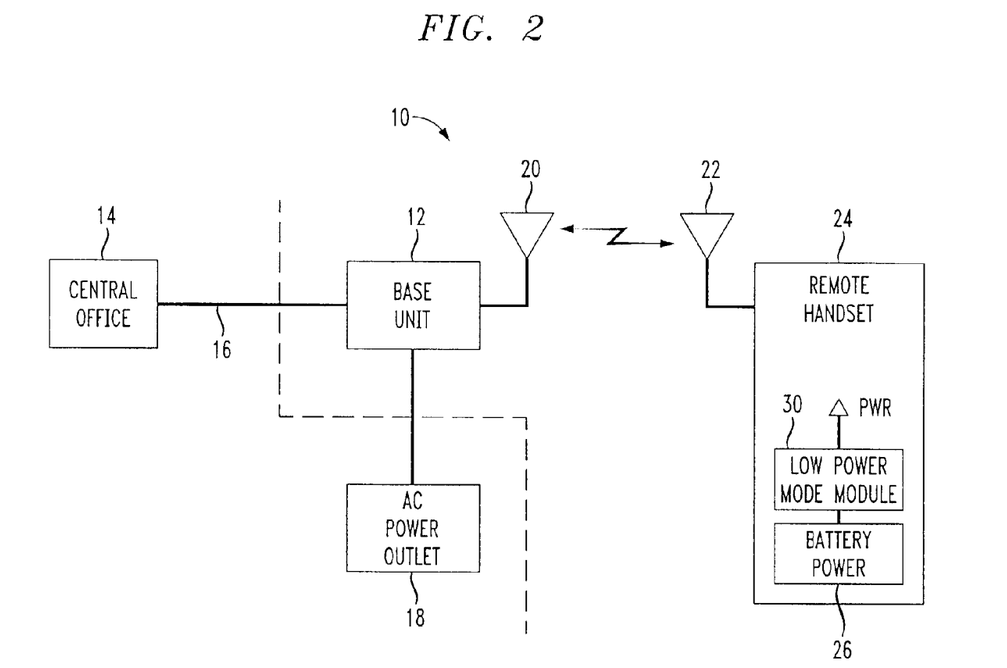
FIG. 2 illustrates an exemplary cordless telephone having extended standby power reduction capability, in accordance with the principles of the present invention, to maximize the battery power of the remote handset when the cordless telephone is in a STANDBY mode.

FIG. 2 illustrates an exemplary cordless telephone, indicated generally at 10, capable of minimizing the power consumption of the battery in the remote handset by minimizing the necessity for the remote handset to enter the ON mode from the STANDBY mode, referred to as an extended STANDBY mode, in accordance with the principles of the present invention.

In particular, in FIG. 2, the cordless telephone 10 reduces standby power needs to maximize the battery power of the battery in the remote handset by maintaining the remote handset of the cordless telephone in an extended STANDBY mode during certain time periods and/or upon the occurrence of certain events during which the status of the base unit/remote handset communications will be known to require fewer status checks, e.g., while another extension telephone is already in use on the same telephone line.

The cordless telephone 10 includes a base unit 12 and a remote handset 24. The base unit 12 is connected to a telephone company central office 14 via a telephone line 16. Power is provided to the base unit 12 through a conventional household AC power outlet 18. The base unit 12 of the cordless telephone 10 of the present invention further includes a base unit antenna 20 to support communications with a remote handset antenna 22 on a remote handset 24.

The remote handset 24 of the cordless telephone 10 includes a battery 26 to provide power to the remote handset 24. The battery 26 is rechargeable through the conventional household AC power outlet 18 by placing the remote handset 24 into a cradle in the base unit 12. Of course, the remote handset 24 may be charged in other ways, e.g., by using a charging module separate from the base unit 12, in accordance with the principles of the present invention.

When a ring signal is detected by the base unit 12 of the cordless telephone 10 over the telephone line 16, an active ring signal status is transmitted to the remote handset 24 through the base unit antenna 20 and the handset antenna 22, to cause the remote handset 24 to ring, thereby indicating an incoming telephone call to the remote user. In accordance with the principles of the present invention, the ring signal is transmitted continuously so the remote handset will receive it when in a receive only mode. The remote handset transitions to a time domain duplex (TDD) transmit/receive mode and emits an audible ring signal.

The exemplary cordless telephone 10 further includes a low power mode module 30, and a low power mode table 38. The low power mode module 30 is preferably a software module which in operation causes the battery 26 in the remote handset 24 to enter an extended STANDBY or other extended low power mode during certain time periods and/or upon the occurrence of a predetermined event. In the extended STANDBY mode, the remote handset 24 does not periodically check the status of the base unit 12 as in an otherwise conventional STANDBY mode or does not check it as often.

As illustrated in FIG. 2, the low power module 30 preferably controls the powering up of the RF front end 34 within the remote handset 24.

Figure 3:
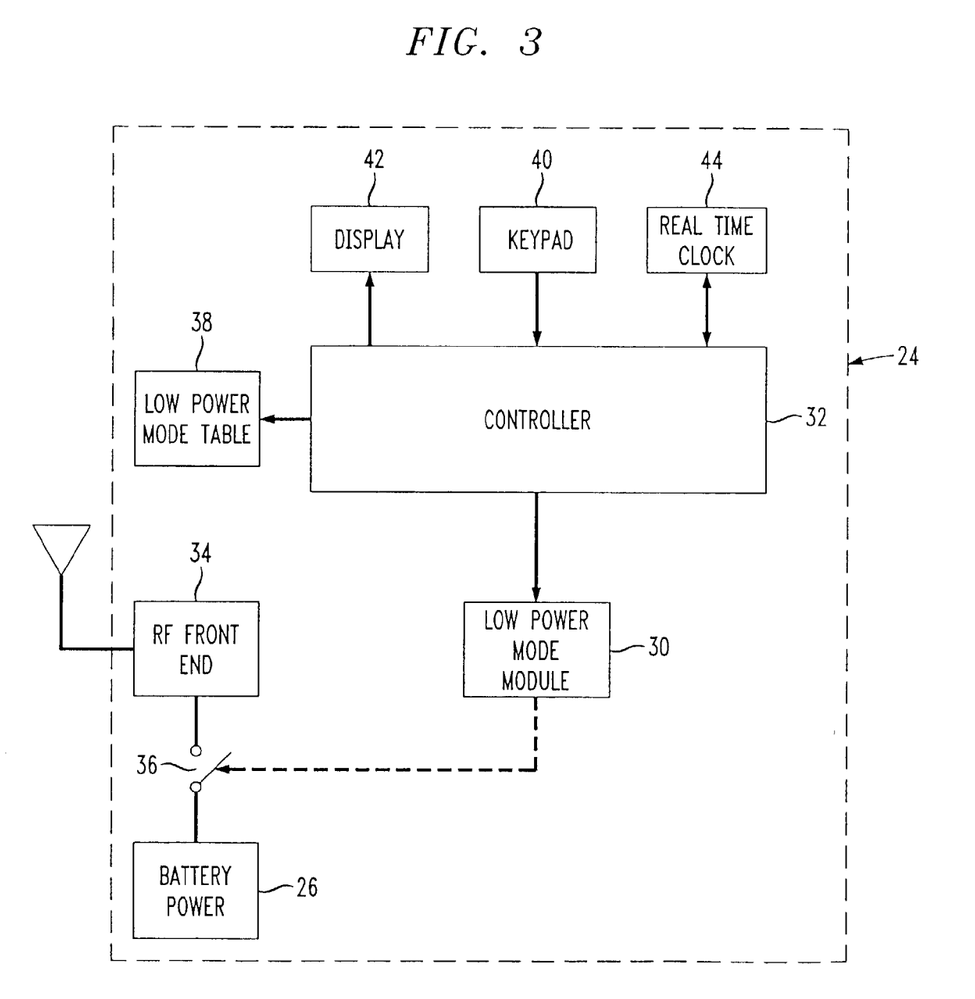
FIG. 3 illustrates a more detailed block diagram of the cordless telephone of FIG. 2 having standby power reduction to maximize the battery power of the remote handset, constructed in accordance with the present invention, wherein the remote handset periodically checks the status of the base unit.

FIG. 3 illustrates a more detailed block diagram of the cordless telephone of FIG. 2 having standby power reduction to maximize the battery power of the remote handset, constructed in accordance with the present invention, wherein the remote handset periodically checks the status of the base unit.

In particular, as illustrated in FIG. 3, the remote handset 24 includes a controller 32 to control the overall functions of the remote handset 24. The controller 32 may be any suitable processor, e.g. a microprocessor, a digital signal processor (DSP), or a microcontroller.

The low power module 30 is preferably a software module included either internal or external to the program code of the controller 32, but is nevertheless preferably in communication with the controller 32.

The remote handset 24 of the cordless telephone 10 further includes an RF front end 34 which can be powered up to an ON mode for RF communications with the base unit 12, or powered down to a STANDBY mode, as depicted by the figurative switch 36.

Figure 4:
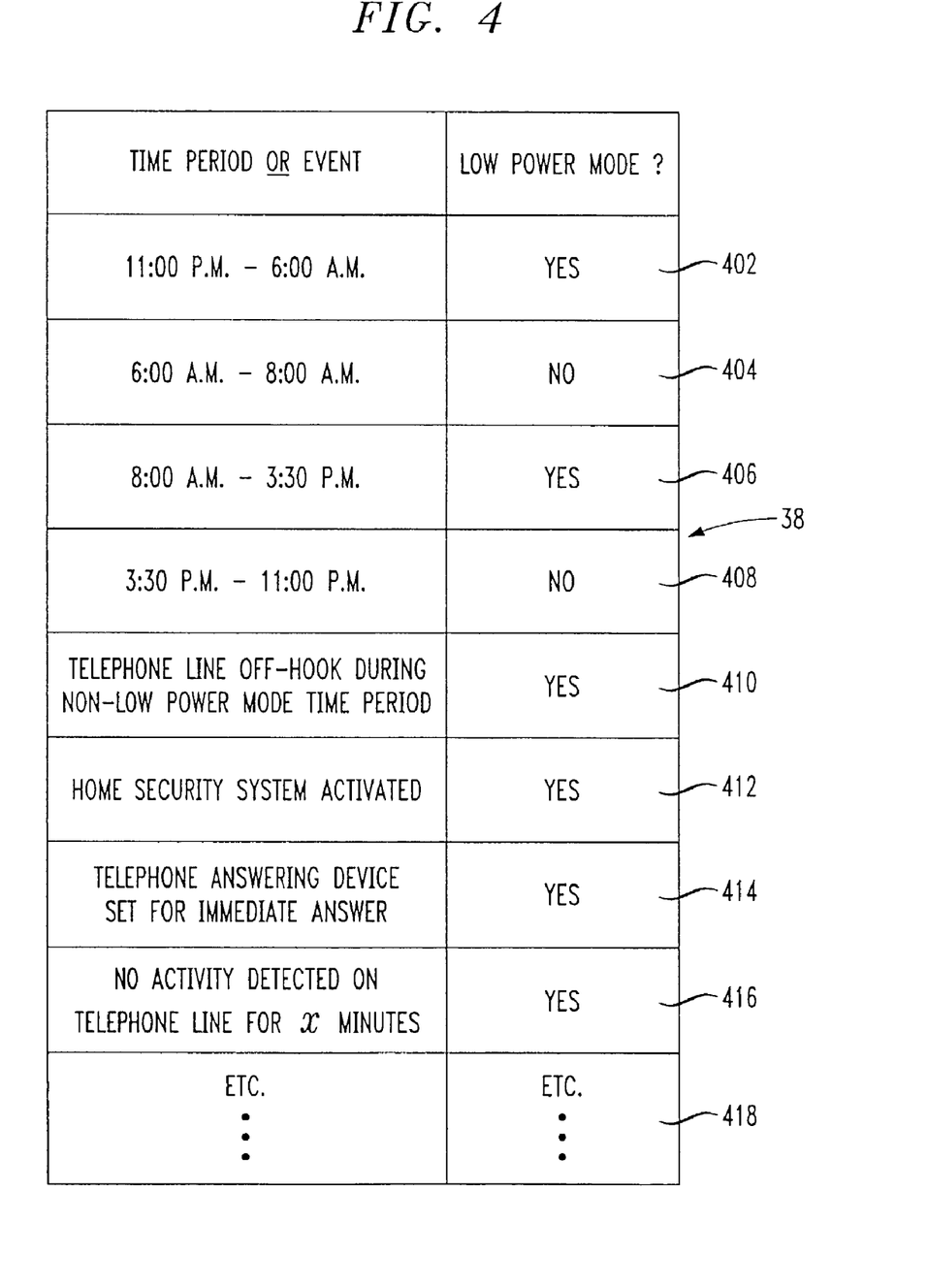
FIG. 4 is a table illustrating an exemplary low power extended STANDBY mode table of a cordless telephone of FIG. 1 or FIG. 2, constructed in accordance with the present invention.

As illustrated in FIGS. 3 and 4, the low power mode table 38 is located in memory (e.g., non-volatile memory such as Flash memory) and is accessible by the controller 32. Although shown in the remote handset 24 in the disclosed embodiments, any or all portions of the low power mode table 38 and/or the low power module 30 may be located in the base unit 12.

Individual entries in the low power mode table 38 store the time periods and/or predetermined event parameters upon which the remote handset 24 is to enter the extended STANDBY mode in accordance with the principles of the present invention. The individual entries containing the defining time periods and/or events can be programmed by the user using a keypad 40, and reviewed on an appropriate display 42. Alternatively, the individual entries can be preprogrammed by the telephone company and/or by the manufacturer of the cordless telephone 10.

For instance, a particular entry in the low power module 30 can cause the low power mode module 30 to cause the remote handset 24 of the cordless telephone 10 to enter the extended STANDBY mode during sleeping hours (e.g., entry 402 in FIG. 4) or during working hours (e.g., entry 406 in FIG. 4) when the cordless telephone 10 is generally not in use.

A real time clock 44 provides the basis for monitoring actual time periods to cause the remote handset 24 to enter the otherwise conventional STANDBY mode (e.g., with 1 second power-ups to sniff mode), or to enter the ON mode or to enter the extended STANDBY mode (e.g., low power mode).

The low power mode module 30 of the remote handset 24 can cause the remote handset 24 to enter the extended STANDBY mode for extended periods of time, e.g., a fixed amount of time such as seven (7) days, fourteen (14) days, twenty-one (21) days, and/or a flexible amount of time based on a predetermined event. Predetermined events can be signaled from, e.g., a home security system.

When armed, a home security system is knowledgeable about the probable status of the persons in the home. For instance, common home alarm systems include "STAY", "AWAY", and "INSTANT" or similar armed modes.

When armed in a STAY mode, a typical home alarm system arms perimeter alarms such as doors and windows, but does not typically arm motion detectors or other alarms which might be set of by a user moving about within the home. A typical STAY arming allows a slight delay before the perimeter doors and windows are armed, to allow a user to program the mode and then to operate the doors, for instance, when leaving for the office in the morning when others remain in the house.

The INSTANT armed mode is similar to that of the STAY mode, but does not provide for any delay (e.g., 45 seconds to 1 minute) after programming the mode for the arming to take place.

Either the STAY mode or the INSTANT mode can be interpreted by a low power mode module to be an indication that the users of a particular electronic device are asleep (and thus not in need of higher power modes with respect to the particular electronic equipment).

Another important mode with respect to the present invention is a mode indicating that the users of the home are not at home. For instance, a mode commonly known as the AWAY mode is armed by a user when leaving a residence. An AWAY mode typically includes arming of various motion detectors throughout the household. When armed in an AWAY mode, a home security system possesses information relating to no one being in the home. In accordance with the principles of the present invention, such "no one home" information can be transmitted to and processed in a low power mode module in an electronic device to cause the electronic device to enter a lower power mode (e.g., an extended STANDBY mode) appropriate for when no one is home. Moreover, when disarmed, the disarmed information can be transmitted to an processed in the low power mode to "wake up" the electronic device and cause it to enter, e.g., a STANDBY mode.

Thus, given the exemplary embodiment of a cordless telephone and armed with information regarding the status of the users of a particular electronic device, prompt ringing of the remote handset 24 may be delayed to reduce power usage when the users are not home to answer the remote handset even if it did ring.

Furthermore, in accordance with the principles of the present invention, the low power mode module 30 can be programmed to reduce the frequency with which the remote handset 24 communicates with the base unit 12 without affecting the perceived utility of the cordless telephone 10. For instance, entries in the low power mode table 38 may establish certain conditions during which slower ring signal response can be tolerated, causing status checks with the base unit 12, e.g., every six (6) seconds, every thirty (30) seconds, every sixty (60) seconds, etc., instead of every one (1) second, for instance.

In another example, the low power mode module 30 in accordance with the principles of the present invention can cause the remote handset 24 of the cordless telephone 10 to enter the extended STANDBY mode when the telephone line 16 is in an off-hook condition and the cordless telephone 10 itself is not in use, indicating that another telephone is using the line. In this case, the extended STANDBY mode is maintained until the end of the current telephone call (i.e., when the telephone line goes back on-hook), or upon activation of any button on the remote handset 24.

Figure 5:
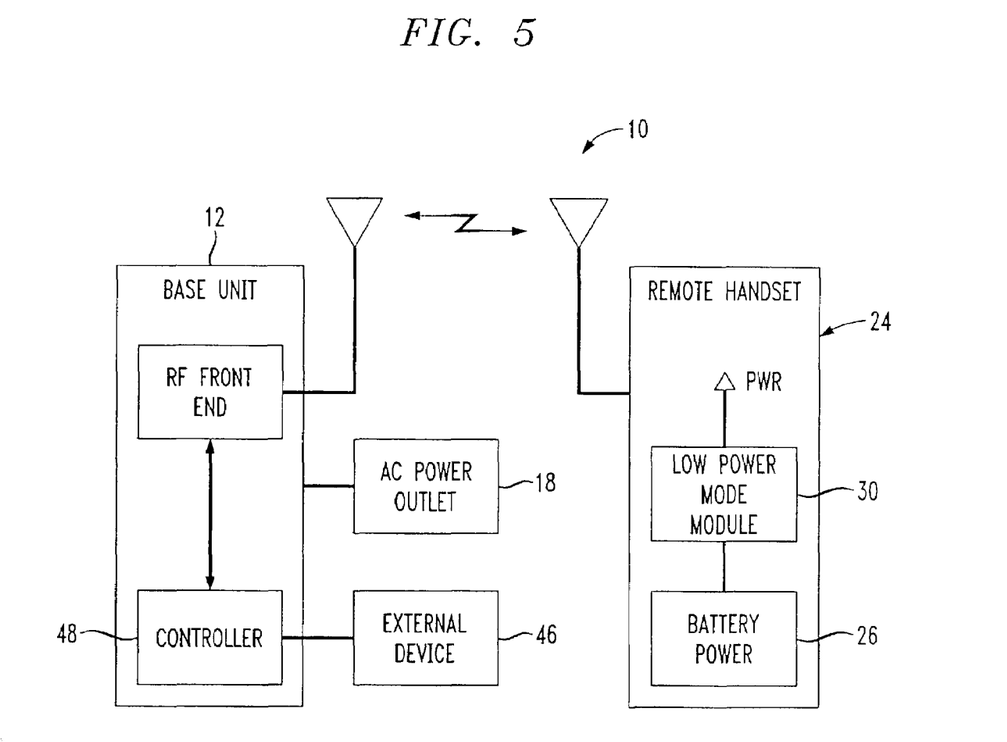
FIG. 5 illustrates another exemplary embodiment of a cordless telephone having extended STANDBY power reduction to maximize the available battery power of the remote handset, wherein the cordless telephone is connected to an external device to provide utilization information, in accordance with the principles of the present invention.

In yet another example, as illustrated in FIG. 5, the low power mode module 30 can cause the remote handset 24 of the cordless telephone 10 to enter the extended STANDBY mode when an external device 46 in communication with the base unit 12 of the cordless telephone 10 indicates, e.g., that no one is presently home to answer the telephone even if the remote handset 24 were to ring immediately. For instance, an external device such as a home security system can be set to indicate to the base unit 12 of the cordless telephone 10 that no one is at home, and that there is thus no need to ring the remote handset 24 and that there is thus no need to promptly ring the remote handset 24.

In another embodiment, the external device 46 can be a telephone answering device which has been set by the user to allow immediate answering of an incoming telephone call, e.g., answering the incoming telephone call with one (1) or no audible ringing by the remote handset 24. In this embodiment, a controller 48 within the base unit 12 determines whether the external device 40 has been activated. If activated, the remote handset 24 enters the extended STANDBY mode and remains in the extended STANDBY mode without transitioning to the otherwise conventional STANDBY mode until allowed to do so by the events determined by the external device 46.

In yet another embodiment, the low power mode module 30 can cause the remote handset 24 of the cordless telephone 10 to enter the extended STANDBY mode wherein longer periods between periodic status checks are made with the base unit 12 at times when no activity on the telephone line 16 (or any telephone on the same telephone line 16) has been detected over a predetermined time period. For instance, the remote handset 24 can be caused to check status once every one (1) second or so as determined by the particular application, when initially entered, and can be increased to check status for longer and longer periods, e.g., five (5) seconds, ten (10) seconds, thirty (30) seconds, etc., and even into the minutes and even hours between status checks with the base unit, as time passes. Thus, although an initial telephone call after a long period of inactivity may not be immediately rung at the remote handset, at least with respect to the first telephone call after a long period of non-use, great power savings will be gained in return.

The cordless telephone 10 of the present invention is not limited to any particular embodiment or method of maximizing the power of the battery 26 of the remote handset 24, e.g., during predetermined time periods and/or upon the occurrence of a predetermined event. While certain embodiments have been described having certain features, it is within the scope of the present invention to, e.g., cease use of the extended STANDBY mode for a predetermined period of time after activity is reported, e.g., for five (5) minutes after a button on the remote handset 24 has been depressed. Furthermore, the present invention is equally applicable to other defined reductions in power requirements other than just a power down of an RF front end. For instance, power savings may be achieved within the principles of the present invention by turning a modem off during an extended STANDBY mode, and/or by placing an appropriate controller or other processor in its own sleep or other low power mode, etc.

While the invention has been described with reference to the exemplary embodiments thereof, those skilled in the art will be able to make various modifications to the described embodiments of the invention without departing from the true spirit and scope of the invention.

What is claimed is:

1. A cordless telephone, comprising:
    a base unit to connect to a telephone network;
    a cordless handset to wirelessly connect to said base unit; and
    a low power module to place said cordless telephone in a low power mode, wherein:
    1) said cordless telephone is coupled to a security system status unit that monitors a security system status; and
    2) said low power module is adapted to enable said low power mode based on said security system status received from said security system status unit wherein said low power mode is an extended STANDBY mode that is active when said security system status is at least one of STAT, AWAY, and INSTANT.

2. The cordless telephone according to claim 1, wherein: said extended STANDBY mode includes at least one of (7) days, fourteen (14) days, and twenty-one (21) days.

3. The cordless telephone according to claim 1, wherein: said cordless telephone comprises at least two cordless handsets.

4. The cordless telephone according to claim 1, wherein, when in:
    said low power mode a ring signal is delayed from reaching said cordless handset of said cordless telephone.

5. The cordless telephone according to claim 1, wherein: operation in said lower power mode is based on a low power mode table.

6. The cordless telephone according to claim 5, wherein: said low power mode table is programmable by at least one of i) a manufacturer of said cordless telephone, ii) a telephone company system coupled to said cordless telephone, and iii) a user of said cordless telephone using a keypad.

7. A method of activating a low power mode in a cordless telephone, comprising:
    monitoring a security system status; and
    placing said cordless telephone in a low power mode based on said security system status
    wherein said cordless telephone is placed in an extended STANDBY mode, said extended STANDBY mode adapted to be activated when said security system status is at least one of STAY, AWAY, and INSTANT.

8. The method according to claim 7, wherein, in said low power mode, the method places said cordless telephone in said extended STANDBY mode.

9. The method according to claim 8, wherein: said extended STANDBY mode includes at least one of (7) days, fourteen (14) days, and twenty-one (21) days.

10. The method according to claim 7, wherein: said low power mode is adapted to delay a ring signal reaching a handset of said cordless telephone.

11. The method according to claim 7, further comprising: controlling said lower power mode based on a low power mode table.

12. The method according to claim 11, further comprising:
    programming said low power mode table by at least one of i) a manufacturer of said cordless telephone, ii) a telephone company system coupled to said cordless telephone, and iii) a user of said cordless telephone using a keypad.

13. The method according to claim 7, wherein: said low power mode corresponds to users of said cordless telephone being asleep.

14. A system for activating a low power mode in a cordless telephone, comprising:
    means for monitoring a security system status; and
    means for placing said cordless telephone in a low power mode based on said security system status
    wherein said cordless telephone is placed in an extended STANDBY mode, said extended STANDBY mode adapted to be activated when said security system status is at least one of STAY, AWAY, and INSTANT.

15. The system according to claim 14, wherein: said low power mode includes said extended STANDBY mode.

16. The system according to claim 15, wherein: said extended STANDBY mode is at least one of (7) days, fourteen (14) days, and twenty-one (21) days.

17. The system according to claim 14, wherein, in said low power mode, a ring signal is delayed from reaching a handset of said cordless telephone.

18. The system according to claim 14, further comprising: means for controlling said lower power mode based on a low power mode table.

* * * * *